(12) United States Patent
Twohig

(10) Patent No.: US 8,188,691 B1
(45) Date of Patent: May 29, 2012

(54) DECOY APPARATUS

(76) Inventor: Steven J. Twohig, Omaha, NE (US)

(*) Notice: Subject to any disclaimer, the term of this patent is extended or adjusted under 35 U.S.C. 154(b) by 323 days.

(21) Appl. No.: 12/547,243

(22) Filed: Aug. 25, 2009

Related U.S. Application Data

(60) Provisional application No. 61/190,027, filed on Aug. 25, 2008.

(51) Int. Cl.
H02P 1/00 (2006.01)

(52) U.S. Cl. ........ 318/139; 318/257; 318/258; 318/268; 318/269

(58) Field of Classification Search .................. 318/139, 318/257, 258, 268, 269
See application file for complete search history.

(56) References Cited

U.S. PATENT DOCUMENTS

| | | | | |
|---|---|---|---|---|
| 5,377,439 A | * | 1/1995 | Roos et al. | 43/3 |
| 6,138,396 A | * | 10/2000 | Capps | 43/3 |
| 6,212,816 B1 | * | 4/2001 | Babbitt et al. | 43/3 |
| 6,601,333 B2 | * | 8/2003 | Cicoff et al. | 43/2 |
| 6,901,693 B1 | * | 6/2005 | Crowe | 43/2 |
| 7,322,144 B2 | * | 1/2008 | Brewer | 43/3 |

* cited by examiner

Primary Examiner — Walter Benson
Assistant Examiner — David Luo
(74) Attorney, Agent, or Firm — Suiter Swantz pc llo

(57) ABSTRACT

The present disclosure is an apparatus for controlling movement of a decoy. The apparatus for controlling movement of a decoy may include a motor and a housing. The motor may cause movement of a decoy coupled to the motor to simulate movement of an animal. The apparatus for controlling movement of a decoy may include a shaft which couples to the motor and the decoy whereby the motor may cause axial rotation of the decoy.

20 Claims, 4 Drawing Sheets

DECOY APPARATUS

CROSS REFERENCE TO RELATED APPLICATIONS

The present application claims the benefit under 35 U.S.C. §119 of U.S. Provisional Application Ser. No. 61/190,027 filed Aug. 25, 2008. Said U.S. Provisional Application Ser. No. 61/190,027 filed Aug. 25, 2008 is hereby incorporated by reference in its entirety.

TECHNICAL FIELD

The present disclosure generally relates to hunting devices, and more particularly to an apparatus for controlling movement of a decoy.

BACKGROUND

Hunters typically utilize decoys in hunting waterfowl. Decoys may refer to artificial animals that may be utilized to entice game within shooting range of a hunter. Conventional decoys may include field-mountable devices and floatable devices formed in a design of a particular waterfowl, such as a duck, and are placed in a water environment to attract waterfowl to a particular area. Conventional decoys have limited success.

SUMMARY

Accordingly, the present disclosure is directed to an apparatus for controlling movement of a decoy. In one embodiment, an apparatus for controlling movement of a decoy may include a motor and a housing supporting the motor. The motor may cause movement of a decoy coupled to the motor to simulate movement of an animal. Additionally, the apparatus for controlling movement of a decoy may include a shaft which couples to the motor and the decoy whereby the motor may cause axial rotation of the decoy.

It is to be understood that both the forgoing general description and the following detailed description are exemplary and explanatory only and are not restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Figure 1:
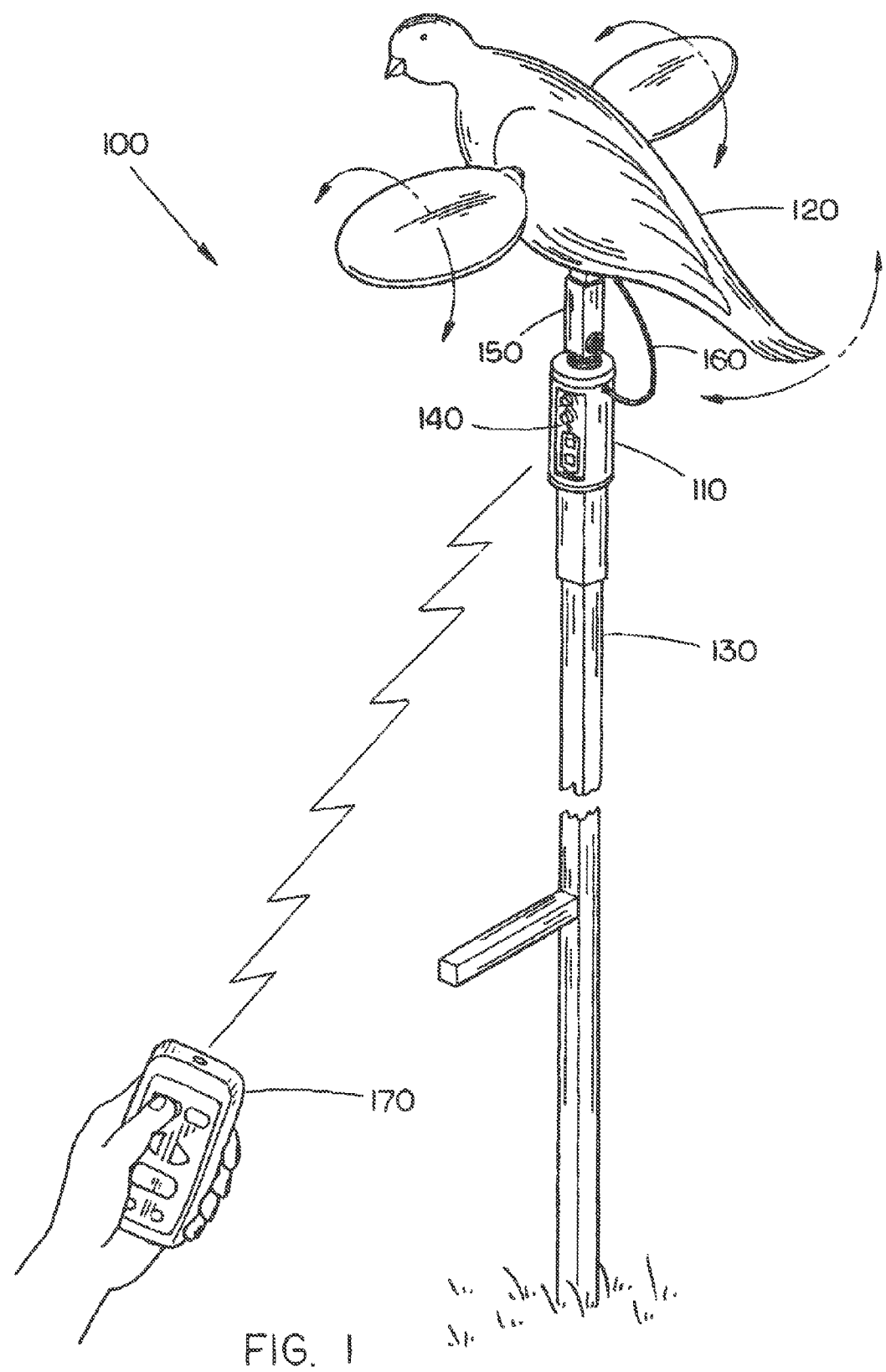
FIG. 1 depicts an apparatus for controlling movement of a decoy.
Figure 2:
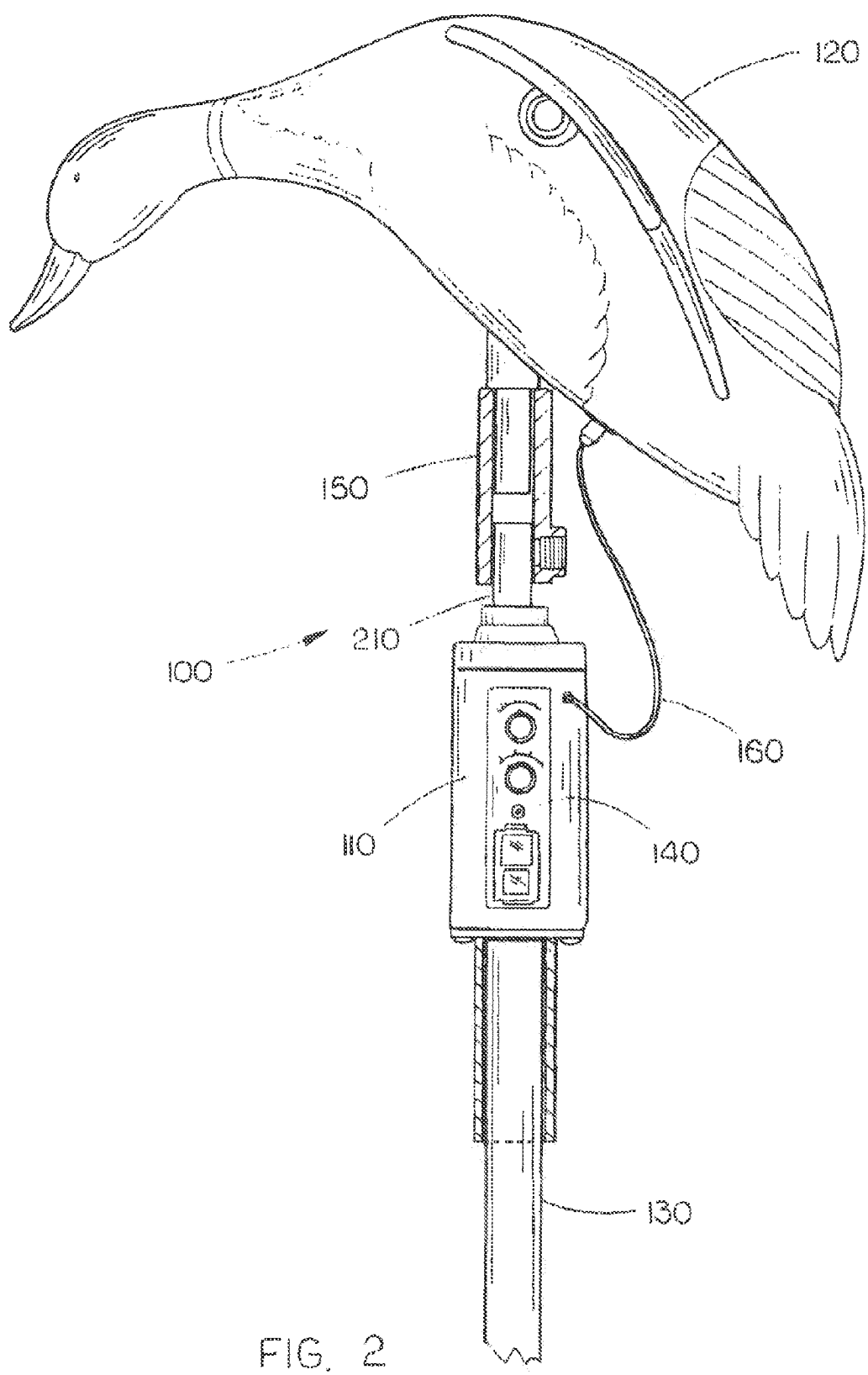
FIG. 2 depicts a detailed view of the apparatus for controlling movement of a decoy.

Reference will now be made in detail to the presently preferred embodiments of the invention, examples of which are illustrated in the accompanying drawings.

Referring to FIGS. 1-4, an apparatus for controlling movement of a decoy according to various embodiments of the disclosure is shown. In one embodiment, apparatus for controlling movement of a decoy (hereinafter referred as "decoy apparatus") may cause axial rotation of a decoy that may be mountable on a stake and may be utilized to lure waterfowl to a particular area. Additionally, decoy apparatus may be employed to deter animals from a particular area. For example, decoy may be in the form of an owl and decoy apparatus may control movement of the decoy to prevent birds from an area surrounding the decoy.

Decoy apparatus 100 may include a housing 110 which may support and house a motor, such as a DC gear motor, and a controller for directing operation of the motor. Motor may be coupled to a decoy 120 to cause movement of decoy 120 to simulate movement of a live animal represented by decoy 120. Decoy apparatus 100 may further include one or more stakes 130 to raise decoy 120 above ground or water to enhance visibility of decoy 120.

Housing 110 may include an interface 140 located on an exterior side of housing 110. Interface 140 may be coupled to controller which may receive user input concerning operation of the motor for controlling movement of decoy 120. Interface 140 may further include a transceiver for receiving wireless control signals from a remote control 170 for receipt of user input. Remote control 170 may transmit wireless signals received by the transceiver of interface 140. Remote control 170 may transmit infrared signals and radio frequency signals according to various embodiments of the disclosure. Controller may be implemented on a circuit board and may include logic gates to translate user input commands received through interface 140 to properly control the motor. In an alternative embodiment, controller may include a microprocessor and memory which would store instructions executable by the microprocessor to translate user commands received through interface. Advantageously, decoy apparatus 100 may be controlled in real-time to further increase the effectiveness of decoy apparatus 100 for luring waterfowl. Interface 140 may include a switch, button and the like for receiving selection for a particular type of decoy whereby operation of the motor may be controlled to simulate movement of the particular type of animal that is represented by the particular type of decoy 120. For example, if the decoy 120 represents a turkey, the interface may provide for a user selection of a turkey and controller may direct operation of the motor to simulate motion of a live turkey.

Decoy 120 may be any type of device. Decoy 120 may be designed to replicate any type of animal, including birds such as waterfowl, including a duck, goose, quayle and the like. Decoy 120 may further be designed to replicate a turkey and owl. It is contemplated that decoy 120 may be a motorized decoy. For example, motorized decoy may include an integrated motor and battery for spinning wings of decoy 120. In an embodiment of the invention, motor of decoy apparatus may further receive power from battery of a motorized decoy via power cable 160. Decoy apparatus 100 may further include an adapter 150 to secure decoy 120 to a shaft 210 which is coupled to a motor of decoy apparatus 100.

Motor may cause movement of decoy 120 to simulate movements of a live animal or waterfowl that is represented by a decoy. In one embodiment, motor may cause decoy to vibrate or waggle by repetitive back and forth motions, or alternatively, repetitive side to side motions. In an additional embodiment, motor may cause axial rotation about stake 130 according to a plurality of modes. It is contemplated that axial rotation of the decoy may include rotary motion about the axis of the decoy 120, such as about the stake 130. One mode of the plurality of modes may include movement of an angle of rotation in a first direction, a pause of a certain time period, and movement of an angle of rotation in a second direction. For example, a first mode may include rotation of a decoy in a first direction for an angle of about 30 degrees, pause for about one second, and rotation of a decoy in a second direction, or opposite direction, for an angle of about 30 degrees. The rotary motion in a first direction, followed by a pause, and then rotary motion in a second direction may represent a cycle. It is contemplated that a first type of cycle may be followed by a second type of cycle following a pause comprising a second time period. It is contemplated that each mode may simulate motion of waterfowl as a particular type of bird may be landing in water so there movement may lure live waterfowl to the same area. It is contemplated that the plurality of modes may include different speeds at which each rotation may occur. For example, the rotation may be performed slowly and may be increased to a higher rate of rotation.

Other modes of operation may include different angles of rotation in both the first direction and second direction along with different time periods for pausing. It is contemplated that rotation may be for a period of time in a first direction followed by rotation for a second period of time in a second direction. The amount of time of rotation in each direction may be adjustable and controllable by a user. For example, decoy apparatus may rotate about 90 degrees in a first direction for a second of time, stop, and rotate in a second direction about 90 degrees for another second of time. Additionally, movement in either direction may be random, continuous or on command by a user. In such a fashion, decoy 120 may sway side to side to replicate landing of a waterfowl into a water environment. Interface 140 and remote control 170 may include one or more user inputs, such as switches, buttons and the like, for allowing selection of a particular mode and particular speed of rotation. Decoy apparatus 100 may further include a position sensor to measure an angle of rotation of decoy 120 and further ensure a proper amount of rotation of decoy 120 in a first direction and a second direction.

Figure 3:
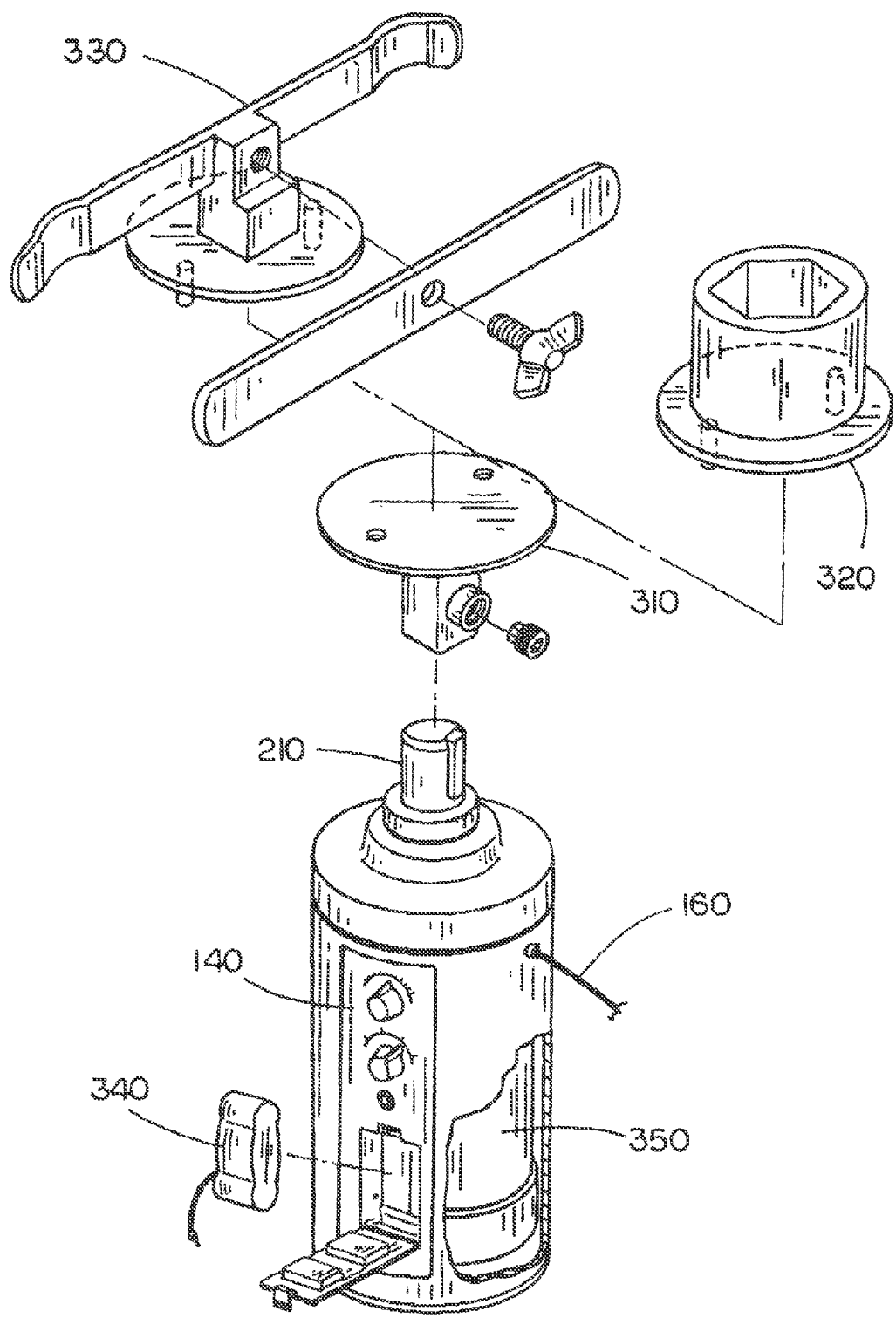
FIG. 3 depicts a detailed view of the housing of the apparatus for controlling movement of a decoy according to a first embodiment of the disclosure.
Figure 4:
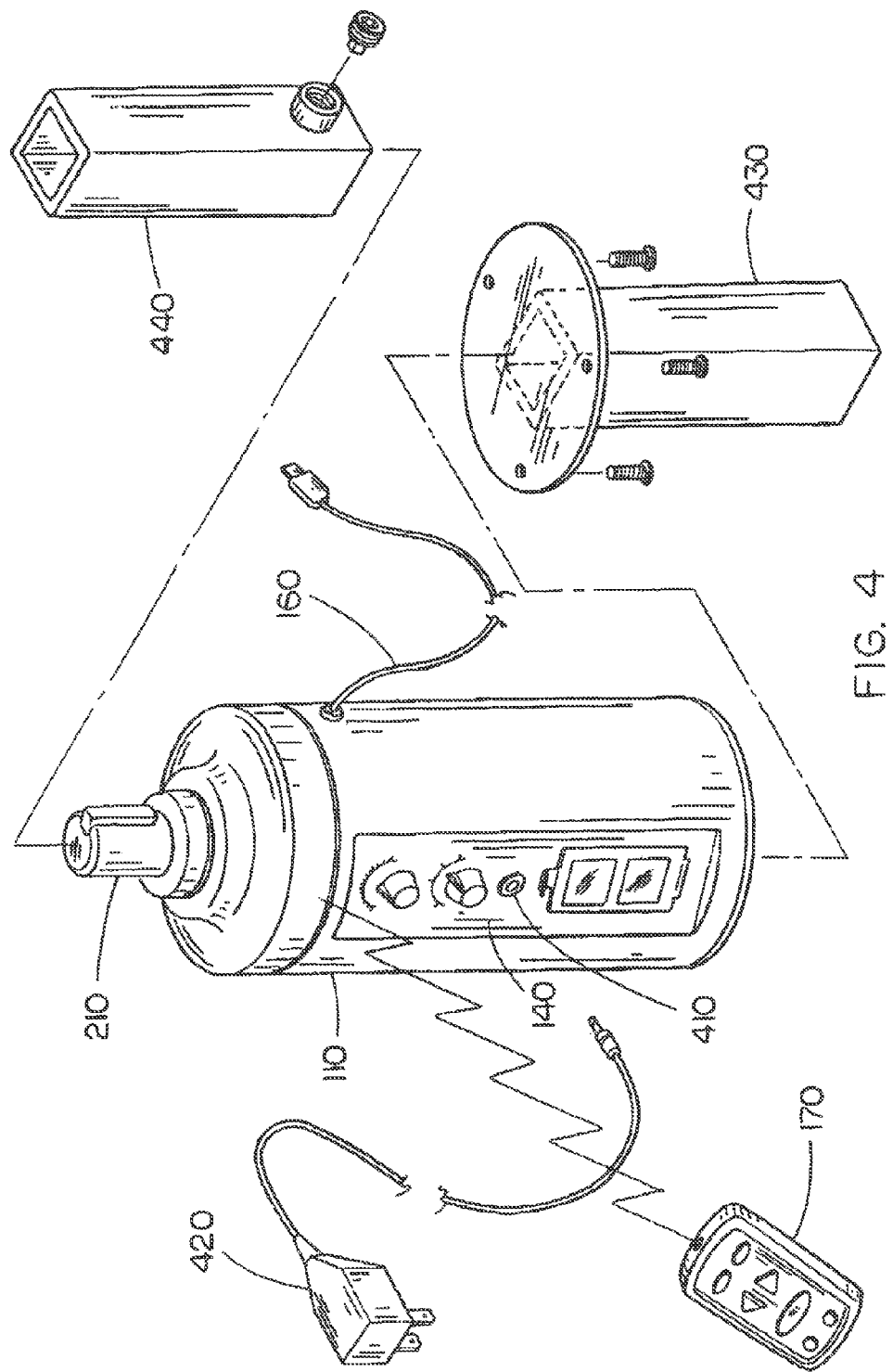
FIG. 4 depicts a detailed view of the housing of the apparatus for controlling movement of a decoy according to an alternative embodiment of the disclosure.

Referring to FIGS. 3-4, decoy apparatus may include various types of decoy adapters 310-330, 440 for securing various types of decoys to shaft 210, shaft 210 may be coupled to motor 350 of decoy apparatus 100. Decoy adapters may be designed and sized to secure any type of decoy and may be provided to allow operation with a variety of decoys. Additionally, decoy apparatus 100 may further include a mounting adapter 430 for coupling the decoy apparatus to stake 130. Mounting adapter 430 may be designed and sized to secure decoy apparatus 100 to stake 130. It is contemplated that other types of adapters 310-330, 440 and mounting adapter 430 may be employed without departing from the scope and intent of the present disclosure.

Decoy apparatus 100 may include an integrated power source 340 for providing power to controller and motor 350. Power source 340 may be a battery. Battery may be a rechargeable battery. Interface 140 may include a port 410 for receiving an AC power jack 420 for recharging a rechargeable battery. Additionally, port 410 may be further coupled to a solar cell (not shown) for recharging a rechargeable battery.

Decoy apparatus 100 may further include one or more gears, gearing systems and the like to provide for an increase or decrease of torque as desired. As shown in FIG. 4, motor may be inline with shaft 210 and one or more gears is inline with said shaft. It is contemplated that motor may be offset from shaft 210 and driving a gear system, including one or more gears, which may be aligned with shaft. It is contemplated that other types of motor and gearing systems may also be employed without departing from the scope and intent of the present disclosure.

It is believed that the present disclosure and many of its attendant advantages will be understood by the forgoing description. It is also believed that it will be apparent that various changes may be made in the form, construction and arrangement of the components thereof without departing from the scope and spirit of the disclosure or without sacrificing all of its material advantages, the form hereinbefore described being merely an explanatory embodiment thereof.

What is claimed is:

1. An apparatus for controlling movement of a decoy, comprising:
   a motor;
   a shaft coupled to said motor;
   a housing, said housing supporting said motor, said motor causes axial rotation of said shaft, said housing being configured for attachment to a stake to place the housing above ground; and
   at least one of a first adapter or a second adapter, said at least one of a first adapter or a second adapter being coupled to said shaft, said first adapter configured to couple with a first type of decoy and said second adapter configured to couple with a second type of decoy.

2. The apparatus as claimed in claim 1, further comprising a power source coupled to said motor, said power source stored in said housing.

3. The apparatus as claimed in claim 2, wherein said power source is a rechargeable battery.

4. The apparatus as claimed in claim 3, further comprising a solar cell coupled to said rechargeable battery.

5. The apparatus as claimed in claim 1, wherein said housing includes a mounting adapter configured to secure to said stake.

6. The apparatus as claimed in claim 1, further comprising a controller coupled to said motor, said controller configured to direct operation of said motor.

7. The apparatus as claimed in claim 6, further comprising an interface coupled to said controller.

8. The apparatus as claimed in claim 7, wherein said interface is located on an exterior side of said housing for receiving user input for operation of said motor.

9. The apparatus as claimed in claim 8, wherein said controller provides a plurality of modes of operation of said motor.

10. The apparatus as claimed in claim 9, wherein said plurality of modes of operation include angle of rotation in a first direction, an amount of delay, and an angle of rotation in a second direction.

11. The apparatus as claimed in claim 10, wherein said controller provides a speed control of rotation of said decoy.

12. The apparatus as claimed in claim 10, wherein said controller provides a speed control of rotation of said decoy.

13. The apparatus as claimed in claim 10, wherein said controller operates a first mode for the first type of decoy representing a first type of animal and operates a second mode for the second type of decoy representing a second type of animal.

14. The apparatus as claimed in claim 13, wherein said first type of decoy is a duck and a second type of decoy is a turkey.

15. The apparatus as claimed in claim 14, wherein said interface includes a switch for selection of the first mode and a second switch for selection of the second mode.

16. An apparatus for controlling movement of a decoy, comprising:
    a motor;

a controller, said controller coupled to said motor, said controller directs operation of said motor according to a plurality of modes, each mode including an angle of rotation in a first direction, an amount of delay, and an angle of rotation in a second direction;

a housing, said housing supporting said motor, said housing being configured for attachment to a stake to place the housing above ground;

an interface coupled to said controller, said interface is located on an exterior side of said housing for receiving user input for operation of said motor;

a shaft coupled to said motor, wherein said motor causes axial rotation of said shaft;

a first adapter configured to couple with a first type of decoy; and a second adapter configured to couple with a second type of decoy, wherein said at least one of a first adapter or a second adapter being couplable to said shaft.

17. The apparatus as claimed in claim 16, further comprising a power source coupled to said motor, said power source stored in said housing.

18. The apparatus as claimed in claim 17, wherein said power source is a rechargeable battery.

19. The apparatus as claimed in claim 18, further comprising a solar cell coupled to said rechargeable battery.

20. The apparatus as claimed in claim 16, wherein said housing includes a mounting adapter configured to secure to said stake.

* * * * *